United States Patent [19]

Iwashita et al.

[11] 4,427,280
[45] Jan. 24, 1984

[54] AUXILIARY POWER SOURCE DEVICE FOR MOTOR DRIVEN CAMERA

[75] Inventors: Tomonori Iwashita, Fuchu; Yukio Mashimo, Kawasaki; Hidehiko Fukahori, Yokohama; Yoshitaka Watanabe, Tokyo, all of Japan

[73] Assignee: Canon Kabushiki Kaisha, Tokyo, Japan

[21] Appl. No.: 349,458

[22] Filed: Feb. 17, 1982

[30] Foreign Application Priority Data

Feb. 24, 1981 [JP] Japan .................................. 56-25972
Apr. 24, 1981 [JP] Japan .................................. 56-25976

[51] Int. Cl.$^3$ ................................................ G03B 1/04
[52] U.S. Cl. ................................................ 354/173.11
[58] Field of Search ................... 354/173, 295; 307/46, 307/52

[56] References Cited

U.S. PATENT DOCUMENTS 3,853,396 12/1974 Ogiso et al. .......................... 354/173
4,362,371 12/1982 Watanabe et al. .................... 354/173

Primary Examiner—Russell E. Adams
Attorney, Agent, or Firm—Toren, McGeady and Stanger

[57] ABSTRACT

An auxiliary power source device to be connected in series to the power source of the motor driven device built in the camera or attachable on the camera so as to increase the winding speed of the camera, so designed that the auxiliary power source device is provided with the load current detecting means in such a manner that the current delivered from the auxiliary power source device to the camera reaches a certain determined value the output voltage of the auxiliary power source device is lowered by means of the output of the load current detecting means.

6 Claims, 6 Drawing Figures

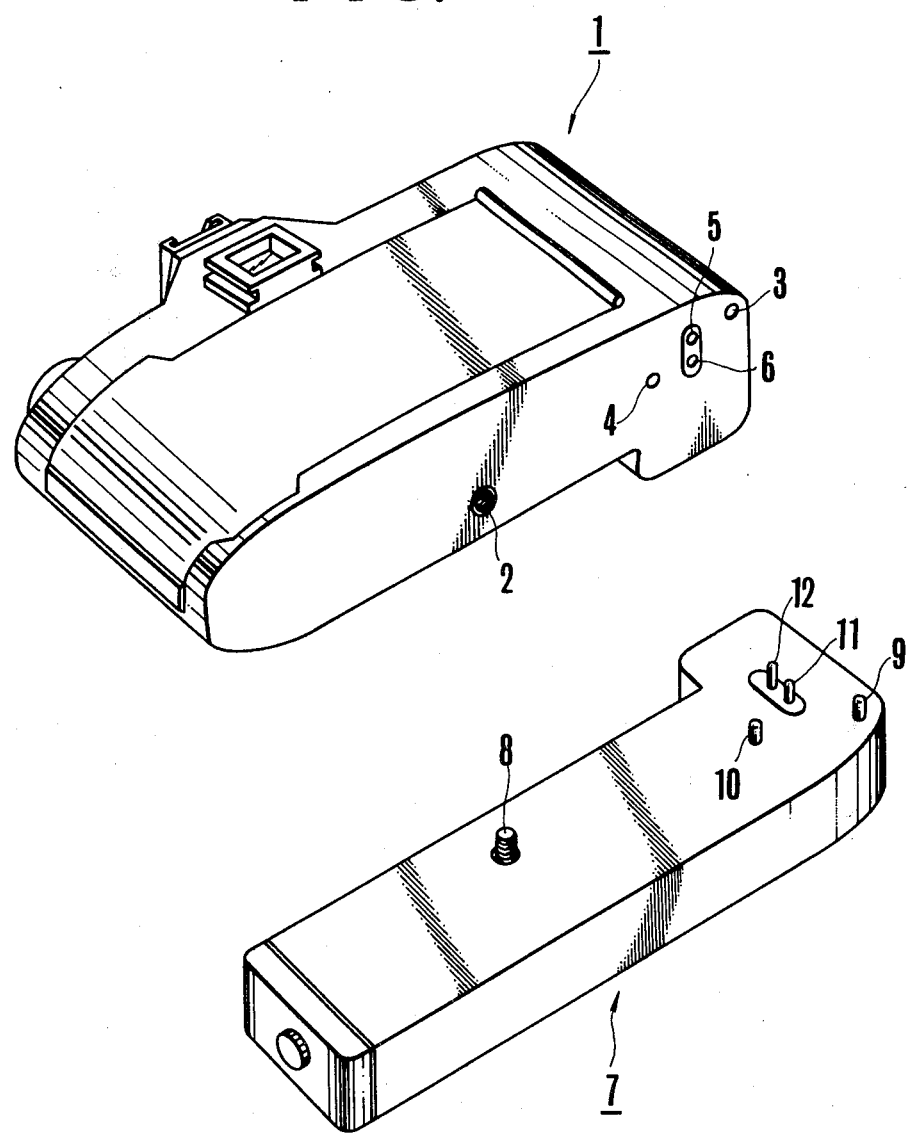

AUXILIARY POWER SOURCE DEVICE FOR MOTOR DRIVEN CAMERA

BACKGROUND OF THE INVENTION

1. Field of the Invention

The present invention relates to an auxiliary power source device for the motor driven camera in which the motor driven device is built or on which it is mounted in order to increase the film winding speed.

2. Description of the Prior Art

Quite recently various kinds of motor driven cameras for carrying out the film winding and the shutter charge by means of a motor have been brought into practice, whereby the motor drive device is attached on the camera body or the motor is built in the camera body. As the power source for these motor driven camera the dry battery or the secondary battery is used, whereby it is mostly built in or fixed in the motor drive device. Consequently, the size and the weight of the power source is desired to be as compact and light as possible. Especially, in case of the camera in which the winding motor is built or the automatic winder it is desired to realize the circuit and the construction in such a manner that as small number of as compact batteries as possible are used, in order to obtain a small and light device. However, when the number of the batteries is decreased the winding speed and the shooting capacity are also decreased.

Generally the characteristics of the winding DC motor for the motor driven camera is shown with the curves A (output torque-consumed current characteristics) and B (output torque-speed characteristics) in FIGS. 1(a) and (b) respectively. The characteristics can be represented as follows:

$$I = C_1 \tau + C_2 \quad (1)$$

$$N = C_3 V - C_4 \tau \quad (2)$$

Hereby, I: consumed current, $\tau$: rotation torque, V: power source voltage, $C_1$–$C_4$: constant, and N: speed.

When such a motor is used as the winding motor for the motor driven camera, it is desired to choose the constant $C_3$ in (2) large (namely, the diameter of the wire of the motor coil large) and the speed of the motor large in order to drive the motor with high efficiency and high output. However, it is impossible to increase the speed of the motor so highly due to the construction of the bearing and so on, whereby ordinarily the no-load speed (namely $\tau=0$) is 10,000–15,000 r.p.m.

There is little problem when the above-mentioned motor is used for the ordinary photographing (for example snap picture) even if the winding speed is low or the shooting capacity is small, while it becomes necessary to increase the winding speed or the shooting capacity in order to carry out the continuous photographing such as for sports photography.

As the solution for the above, for example, the U.S. Pat. No. 3,853,396 discloses a method in accordance to which the auxiliary power source is connected in series to the driving power source. However, if the auxiliary power source is only connected in series to the driving power source, as is clear from (2) only V becomes large and the curve B in FIGS. 1(a) and (b) is translated parallely so that the curve when the auxiliary power source is used becomes D (output torque-speed characteristics). Then, as is clear from FIG. 1(a) and formula (2), the starting torque (when the speed is 0) is increased from $\tau_1$ up to $\tau_2$, while as is clear from FIG. 1(a) and formula (1), the starting current is increased from $I_1$ up to $I_2$. Thus, in case of the conventional device the starting torque is increased so that when the auxiliary power source is used a too high torque is applied to the film when a predetermined number of pictures have been taken with the result that the film is often damaged, which is inconvenient. Further, the starting current is also increased so that the motor control switch, the transistors and so on for large current have to be used in the motor driven camera with the result that the manufacturing cost of the motor driven camera increases while its size becomes also large.

Further, not only the starting torque and the starting current are increased but also, as is clear from FIG. 1(b), the no-load speed $N_2$ is also increased so that, as mentioned above, the no-load speed ranging from 10,000–15,000 r.p.m. which is achieved by the driving power source alone is increased further when the auxiliary power source is used, and this shortens the life of the motor and often damages it, which is inconvenient. Further, in order to eliminate the above shortcomings, a motor with governer has been proposed, whereby the motor is complicated in the construction so that the manufacturing cost is high and there easily takes place damage, which is inconvenient.

SUMMARY OF THE INVENTION

An object of the present invention is to prevent the increase of the starting torque and the starting current of the motor when the auxiliary power source is used, by providing a means for lowering the output of the auxiliary power source when the output current of the auxiliary power source reaches a predetermined value.

Another object of the present invention is to check the increase of the no-load speed.

BRIEF DESCRIPTION OF THE DRAWINGS

FIG. 2 shows an embodiment of the present invention in perspective view for showing the motor driven camera and the auxiliary power source device in a concrete way.

DESCRIPTION OF THE PREFERRED EMBODIMENTS

Figure 1A:
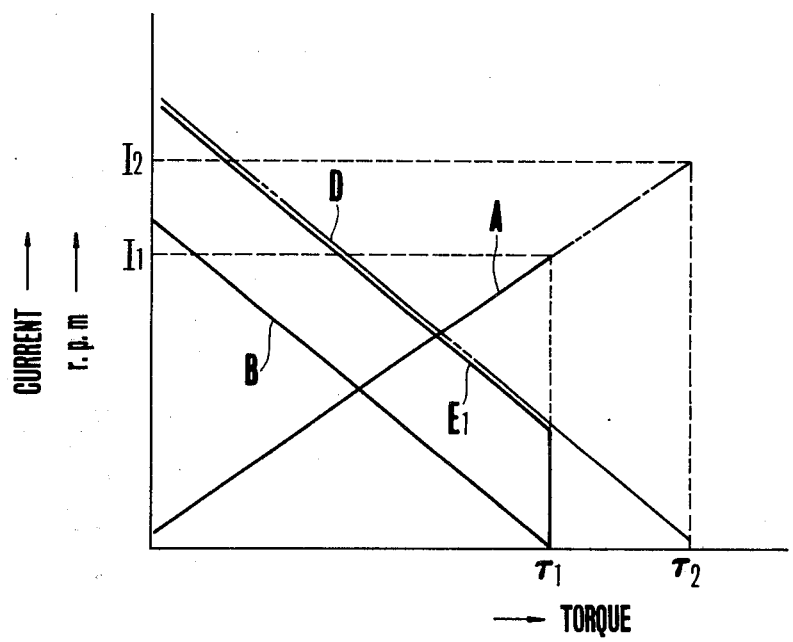
FIGS. 1(a) and (b) show the characteristic curve of a DC motor for explaining the operation of the present invention.

Below the present invention will be explained in detail in accordance with FIGS. 2 and 3 of the first embodiment hereof.

FIG. 2 shows the motor driven camera and the auxiliary power source device. In the drawing, 1 is the camera in which the winding motor and the power source are built in such a manner that the winding motion can be done with the motor. 2 is the tripod screw arranged on the bottom surface of the motor driven surface, 3 is the guide hole, 4 is the movable pin and 5 and 6 are the terminals to be connected to the auxiliary power source device. 7 is the auxiliary power source device in which the auxiliary power source and the power source control circuit are built, 8 is the mounting screw for mounting the device on the motor driven camera, 9 is the guide pin, 10 is the fixed pin and 11 and 12 are the terminals to be electrically connected to the terminals 5 and 6 of the motor driven camera respectively.

Figure 3:
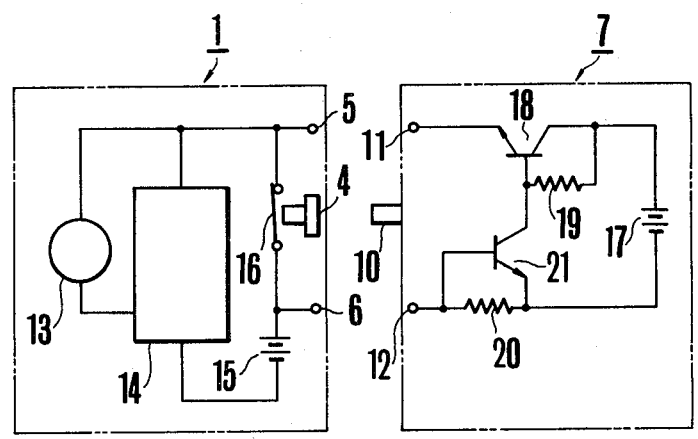
FIG. 3 shows the current supply circuit of the motor driven camera and the auxiliary power source device shown in FIG. 2.

In FIG. 3, 13 is the driving motor in the motor driven camera, whose driving is controlled by means of the motor control circuit 14. 15 is the driving power source in the motor driven camera for supplying the power to the motor 13 and the control circuit 14 through the switch 16 for the driving power source. The switch is normally in the opened state and closed when the movable pin 4 is depressed, whereby the terminals 5 and 6 are arranged at the both ends of the switch 16. The above-mentioned elements are arranged in the motor driven camera 1. In the auxiliary power source device 7, the auxiliary power source is arranged. Between the positive side of the auxiliary power source 17 and the terminal 11, the output voltage control transistor 18 is connected as is shown, while between the base and the collector of the transistor 18, the resistor 19 is connected. Between the negative side of the auxiliary power source 17 and the terminal 12 the output current detecting resistor 20 is connected, while between the both terminals of the resistor and the base of the transistor 18, the transistor 21 is connected as is shown in the drawing.

Below the operation of the above-mentioned construction will be explained.

Because the movable pin 4 is not depressed when only the motor driven camera 1 is used without mounting the auxiliary power source device 7 on the motor driven camera 1, the switch 16 is in the closed state and the auxiliary power source device 15 is controlled by means of the control circuit 14 in such a manner that the current flows from the plus side of the powder source 15 through the switch 16, the motor 13 and the control circuit 14 to the negative side of the power source 15, whereby the motor 13 carries out the winding operation. When the auxiliary power source device 7 is to be used the auxiliary power source device 7 is mounted on the bottom surface of the motor driven camera 1, by bringing the guide pin 9 into the guide hole 3 and rotating the mounting screw 3 so as to be screwed into the tripod screw 2 of the motor driven camera 1. Then the fixed pin 10 depressed the movable pin 4 so as to open the switch, while the terminals 5 and 6 are electrically connected to the terminals 11 and 12 respectively.

Then the driving power source 15 is connected in series to the auxiliary power source 17 and controlled by means of the control circuit 14 in such a manner that the current flows from the positive side of the power source through the terminal 12, the resistor 20, the power source 17, the transistor 18, the terminal 11, the terminal 5, the motor 13, the control circuit 14 and the negative side of the power source 15, whereby the motor 13 carries out the winding motion. When at the time of the motor start or the like the driving current of the motor, namely the output current of the auxiliary power source becomes larger than a predetermined value, the transistor 21 is brought into the closed state by means of the voltage difference between the both ends of the resistor. Then the potential at the base of the transistor 18 lowers and the voltage difference between the terminals 11 and 12 lowers. Thus the motor 13 shows the characteristics $E_1$ in FIG. 1(a).

Below the present invention will be explained in accordance with FIGS. 4 and 5 of the second embodiment hereof. Hereby, the members having the same figures as those in FIGS. 2 and 3 are the same members.

Figure 4:
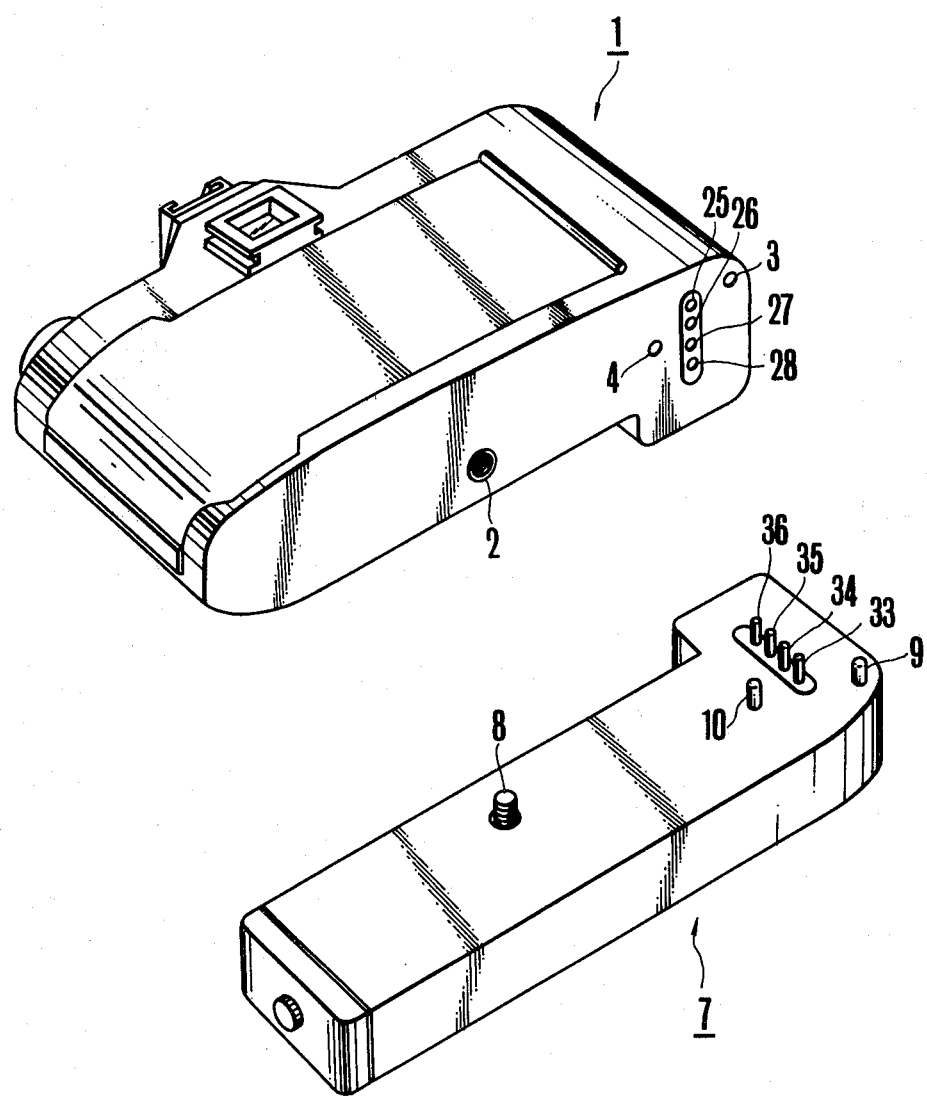
FIG. 4 shows a second embodiment of the present invention in perspective view for showing the mount portion of the motor driven camera and the auxiliary power source device in a concrete way.

FIG. 4 shows the motor driven camera and the auxiliary power source device. In the drawing, 1 is the motor driven camera in which the winding motor and the driving power source are built so as to carry out the winding operation by means of the motor. 2 is the tripod screw arranged on the bottom surface of the motor driven camera, 3 is the guide hole, 4 is the movable pin and 25, 26, 27 and 28 are the terminals to be connected to the auxiliary power source. 7 is the auxiliary power source device in which the auxiliary power source and the power source control circuit are built. 8 is the mounting screw for mounting the device on the motor driven camera, 9 is the guide pin, 10 is the fixed pin and 33, 34, 35 and 36 are the terminals to be electrically connected to the terminals of the motor driven camera respectively.

Figure 5:
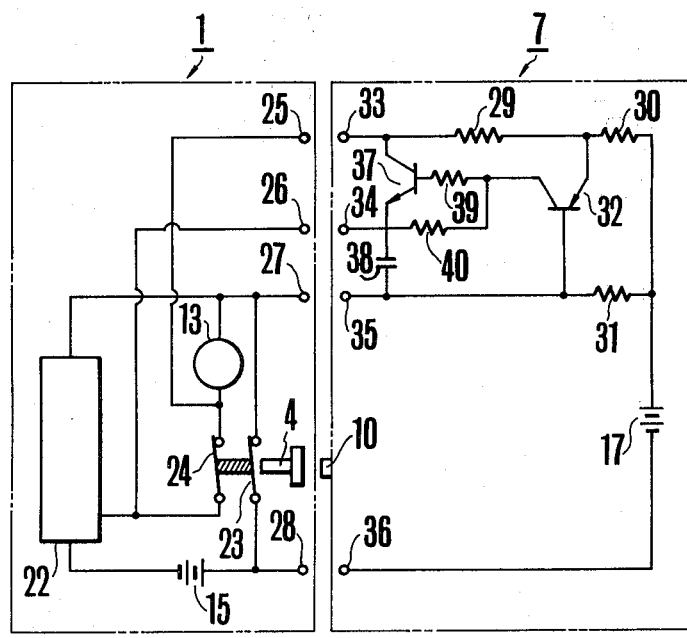
FIG. 5 shows the current supply circuit of the motor driven camera and the auxiliary power source device shown in FIG. 4.

In FIG. 5, 1 is the motor driven camera including the circuit at the side of the motor driven camera, 7 is the auxiliary power source device including the circuit at the side of the auxiliary power source device and 13 is the driving motor in the motor driven camera 1 to be controlled by means of the motor control circuit 22. 15 is the driving power source in the motor driven camera for supplying the current to the motor 13 and the control circuit 22 through the first switch 23. The first switch 23 is mechanically engaged with the second switch 24 connected between the motor 13 and the control circuit 22, whereby both of the switches are normally in the closed state and opened when the movable pin 4 is depressed. In the auxiliary power source device 7, the auxiliary power source 17 is arranged. 29, 30 and 31 are the resistors, which make a bridge circuit with the motor 13 in the motor driven camera when the auxiliary power source device is mounted on the motor driven camera. 32 is the transistor connected at the neutral point between the resistors 29 and 30 and the resistor 31 and the terminal 35 so as to detect the power of the bridge circuit. 37 is the transistor which is connected between the terminals 33 and 34 as is shown in the drawing, and controls the voltage to be applied to the motor 13 in accordance with the output of the transistor 32. 38 is the condenser for actuating the transistor at the time of the start of the motor 13, and 39 and 40 are the resistors connected as is shown in FIG. 5.

Below the operation of the above construction will be explained.

Because the movable pin 4 is not depressed in case only the motor driven camera is used without mounting the auxiliary power source device 7 on the motor driven camera 1, the first and the second switches 23 and 24 are in the closed state the driving power source 15 is controlled by means of the control circuit in such a manner that the current flows from the positive side of the power source 15, through the switch 23, the motor 13, the switch 24 and the control circuit 22 to the negative side of the power source 17, whereby the motor 13 carries out the winding motion. In case the auxiliary power source device 7 is used, the device is mounted on the bottom surface of the motor driven camera 1 by bringing the guide pin 9 into the guide hole 3 and screwing the mounting screw 8 into the screw 2 in the tripod of the motor driven camera. Then the fixed pin 10 depresses the movable pin 4 and opens the first and the second switches 23 and 24, while the terminals 25, 26 27 and 28 are connected to the terminals 33, 34, 35 and 36, respectively. Then, the driving power source 15 and the auxiliary power source 17 are connected in series to each other and controlled by the means of the control circuit 22 in such a manner that the current flows from the positive side of the power source 15 through the terminal 28, the terminal 36, the power source 17, the resistor 31, the terminal 35, the terminal 27, the motor 13, the terminal 25, the terminal 33, the transistor 37, the terminal 34, the terminal 26 and the control circuit 22 to the negative side of the power source 15, whereby the motor 13 carries out the winding operation of the camera. Along with the start of the winding operation, the terminal 26 in the control circuit is connected to the negative side of the driving power source 15 so as to bring the transistors 37 and 32 into the closed state. When the transistor 32 is brought into the closed state, the motor 13 starts to run. When the speed of the motor 13 is increased (about $N_1$ in FIG. 1) the impedance of the motor is increased. Because at this time, the emitter potential of the transistor 32 is fixed by means of the resistors 29 and 30, the output current of the transistor 32 decreases. Consequently, the base current of the transistor 37 decreases. Thus, the collector potential of the transistor 37 goes up so as to decrease the voltage applied to the motor 13.

Figure 1B:
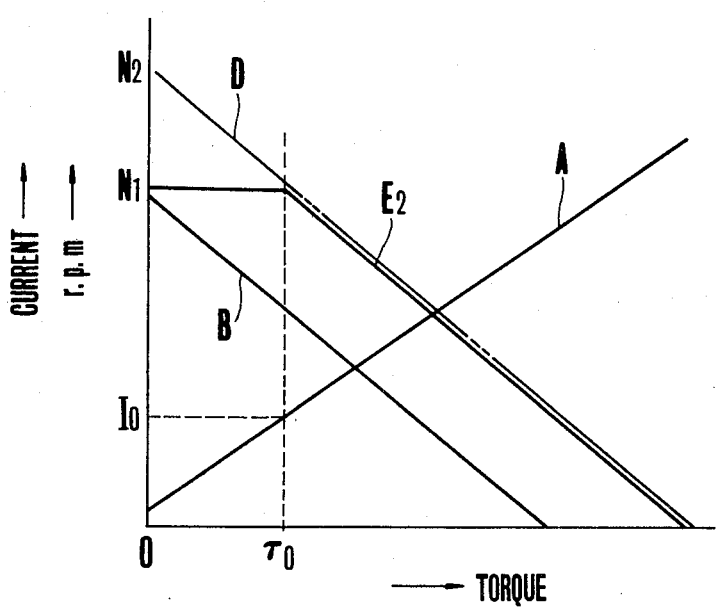

Namely, when the speed becomes larger than $N_1$ in FIG. 1, the voltage applied to the motor decreases along with the decrease of the impedance, namely the consumption current of the motor, assuring the characteristics $E_2$ in FIG. 1(b).

In order to represent the above characteristics $E_2$ in FIG. 1(b) in equation, $\tau$ is eliminated out of formulas (1) and (2).

$$N = C_3 V - C_4(I - C_2/C_2) = C_3 V + C_5 I + C_6 \tag{3}$$

Hereby, $C_5$ and $C_6$ are the constants. Now let the consumption current when the output torque $\tau_1$ in FIG. 1 be $I_1$, so $$N = C_7 \text{ (constant)} \tag{4}$$

when $I \leq I_1$, because it is sufficient to check the increase of the number of rotation between the output torque $\tau_1$ and no load.

N is eliminated out of formulas (3) and (4). Thus, $$C_3 V + C_5 I + C_6 = C_7$$

Therefore, $$V = -C_8 I + C_9 \tag{5}$$

($C_8$, $C_9$: constant)

Consequently, in case the output current of the auxiliary power source device is smaller than a predetermined value ($I_1$), such a characteristics as $E_2$ in FIG. 2(b) can be obtained if the output voltage of the auxiliary power source device is lowered proportionally to the value of the current.

Further, the above embodiments refer to the auxiliary power source device for the motor driven camera in which the motor is built, while it goes without saying that the present invention can be applied to the auxiliary power source device for the separate motor driven device.

As is explained above in accordance with the present invention, the starting torque and the starting current are not increased when the auxiliary power source is used so that the film is not damaged when the film is consumed and the speed of the motor does not become larger than a predetermined value in such a manner that the motor is not damaged and the winding speed and the shooting capacity can be increased. Further, the control circuit for changing the motor characteristics can be installed in the auxiliary power source device so that the manufacturing cost of the motor driven camera does not become higher nor the size becomes larger.

What is claimed is:

1. An auxiliary power source device for a motor driven camera comprising:
   an auxiliary power source;
   a terminal for connecting the auxiliary power source to the power source of the motor driven camera so as to supply current to the winding motor of the motor driven camera;
   detecting means to be connected between the auxiliary power source and the terminals so as to detect the load current to the winding motor; and
   mens for lowering the voltage applied to the winding motor by means of the output of the detecting means when the detecting means detects that the load current reaches a predetermined value.

2. A device in accordance with claim 1, wherein the means for lowering the voltage includes a transistor and lowers the voltage to be applied to the winding motor by changing the output of the transistor.

3. A device in accordance with claim 2, wherein the detecting means includes a second transistor, which controls the output of the first transistor when the load current of the winding motor reaches the predetermined value.

4. An auxiliary power source device for a motor driven camera comprising:
   an auxiliary power source;
   a first terminal for connecting the auxiliary power source to the power source of the motor driven camera;
   a second terminal for connecting the auxiliary power source is the winding motor;
   detecting means to be connected between the first terminal and the auxiliary power source so as to detect the output current of the auxiliary power source, said means producing a signal when the output current reaches a predetermined value; and
   voltage control means to be connected between the second terminal and the auxiliary power source, so as to lower the output voltage of the auxiliary power source by means of a signal from the detecting means.

5. A device in accordance with claim 4, wherein the detecting means includes a resistor connected between the first terminal and the auxiliary power source, and a first transistor with a base and an emitter connected by the resistor, and the voltage control means includes a second transistor with a base connected to the collector of the first transistor and with an emitter and collector connected between the second terminal and the auxiliary power source.

6. An auxiliary power source device for motor driven camera comprising:
   an auxiliary power source including:

(a) an auxiliary power source;
(b) detecting means for detecting the output current from the auxiliary power source, said means producing a detecting signal when the output current reaches a predetermined value; and
(c) voltage control means for controlling the output voltage of the auxiliary power source, said means lowering the output voltage of the auxiliary powder source by means of the detecting signal of the detecting means;

a motor driven camera on which the auxiliary power source device is mountable, said camera including:
(d) a power source;
(e) a winding motor;
(f) motor control means connected between the motor nd the power source; and
(g) change over means to be changed over between a first position at which only the power source is connected to the motor and a second position at which the power source connected to the auxiliary power source is connected to the motor, said means being changed over to the second position by mounting the auxiliary power source.

* * * * *